United States Patent
Shefet et al.

(10) Patent No.: US 6,878,053 B2
(45) Date of Patent: Apr. 12, 2005

(54) AUTOMATED LOADERS OR WINDERS AND RELATED SYSTEMS, DEVICES AND METHODS

(75) Inventors: Sarid M. Shefet, Cary, NC (US); Lawrence Alan Chandler, Raleigh, NC (US); John Michael Phillips, State Road, NC (US); Frank Michael Horvath, Jr., Harmony, NC (US); Richard Rodeheaver Hawkins, Raleigh, NC (US); Larry Jones, Garner, NC (US)

(73) Assignee: ConAgra Foods, Inc., Edina, MN (US)

( * ) Notice: Subject to any disclaimer, the term of this patent is extended or adjusted under 35 U.S.C. 154(b) by 0 days.

(21) Appl. No.: 10/170,652

(22) Filed: Jun. 13, 2002

(65) Prior Publication Data

US 2003/0171086 A1 Sep. 11, 2003

Related U.S. Application Data

(60) Provisional application No. 60/362,375, filed on Mar. 7, 2002.

(51) Int. Cl.$^7$ .............................................. A22C 11/00
(52) U.S. Cl. .................................................... 452/177
(58) Field of Search ............................. 452/30–35, 37, 452/51

(56) References Cited

U.S. PATENT DOCUMENTS

| | | | |
|---|---|---|---|
| 2,697,850 A | 12/1954 | Cross | ........................... 452/47 |
| 3,022,745 A | 2/1962 | Roberts | ....................... 104/99 |
| 3,533,495 A | 10/1970 | Wallace | |
| 3,964,129 A | 6/1976 | Townsend | |
| 4,060,875 A | 12/1977 | Gosling et al. | |
| 4,079,666 A | 3/1978 | Plemons et al. | |
| 4,112,546 A | 9/1978 | Muller | |
| 4,129,923 A | * 12/1978 | Hoegger | ....................... 452/46 |
| 4,218,003 A | 8/1980 | Plewa et al. | ................... 452/31 |

(Continued)

FOREIGN PATENT DOCUMENTS

| | | |
|---|---|---|
| DE | 3137276 | 4/1983 |
| EP | 0399582 | 1/1990 |
| FR | 2.088.622 | 4/1970 |

OTHER PUBLICATIONS

PCT International Search Report, International Application No. PCT/US03/05014 filed Feb. 20, 2003; mailed Apr. 16, 2004.
Article, "Continuous Process Systems", Alkar, http://www.alkar.com (date unavailable; believed to be dated before Mar. 1, 2002) pp. 1–3.
Article, "Batch Ovens", Alkar, http://www.alkar.com (date unavailable; believed to be dated before Mar. 1, 2002) pp. 1–3.
Brochure, "Fessmann Turbomat 7000: Industrial Smoking and Cooking", Fessman Group (date unavailable; believed to be dated before Mar. 1, 2002) pp. 1–8.
Brochure, "Fessmann Smoking Cooking Cooling", Fessman Group (date unavailable; believed to be dated before Mar. 1, 2002) pp. 1–8.
Brochure, "Fessmann Transfer 4000: Continuous Smoking, Cooking and Cooling", Fessman Group (date unavailable; believed to be dated before Mar. 1, 2002) pp. 1–9.
Pictures of the inside of a conventional prior art oven from Alkar.

*Primary Examiner*—Thomas Price
(74) *Attorney, Agent, or Firm*—Myers Bigel Sibley & Sajovec PA

(57) ABSTRACT

Automated loaders are configured with winding mechanisms that wind elongated products directly onto transfer members, such as sticks or rods, by causing the arm to follow a repetitive motion pattern above and below the stick or rod to discharge the elongated product in a winding motion onto the stick or rod. Methods for discharging elongated product, such as encased meats, so that they loop directly onto the stick, bar or other desired food support is also described.

44 Claims, 13 Drawing Sheets

U.S. PATENT DOCUMENTS

| | | | |
|---|---|---|---|
| 4,565,282 A | 1/1986 | Olsson et al. | |
| 4,582,047 A | 4/1986 | Williams | |
| 4,612,684 A | 9/1986 | Kollross | 452/35 |
| 4,644,607 A | 2/1987 | Sziede | 17/45 |
| 4,682,385 A | 7/1987 | Kasai et al. | |
| 4,761,854 A | 8/1988 | Schnell et al. | 17/1 R |
| 4,766,645 A | 8/1988 | Lamartino et al. | |
| 4,880,105 A * | 11/1989 | Kasai et al. | 198/465.4 |
| 4,997,365 A | 3/1991 | Lanham | |
| 5,049,108 A | 9/1991 | Staudenrausch | |
| 5,078,120 A | 1/1992 | Hwang | |
| 5,098,332 A | 3/1992 | Handel | 452/46 |
| 5,277,301 A | 1/1994 | Fenty | |
| 5,354,229 A | 10/1994 | Markwardt et al. | 452/51 |
| 5,354,230 A | 10/1994 | McFarlane et al. | 452/51 |
| 5,480,346 A * | 1/1996 | Kasai et al. | 452/47 |
| RE35,259 E | 6/1996 | Williams | |
| 5,788,563 A | 8/1998 | Nakamura et al. | |
| 5,830,050 A | 11/1998 | Nakamura et al. | 452/31 |
| 5,942,265 A | 8/1999 | Roberds et al. | |
| 6,066,035 A | 5/2000 | Hergott et al. | 452/31 |
| 6,071,186 A | 6/2000 | Shibata et al. | |
| 6,213,368 B1 | 4/2001 | Vermeer et al. | 226/104 |
| 6,277,018 B1 | 8/2001 | Cody et al. | 452/51 |
| 6,468,143 B1 | 10/2002 | White et al. | 452/32 |
| 6,523,462 B1 * | 2/2003 | Johnson et al. | 99/443 C |
| 2003/0171084 A1 | 9/2003 | Shefet et al. | 452/35 |
| 2003/0171088 A1 | 9/2003 | Shefet et al. | 452/187 |
| 2003/0190382 A1 | 10/2003 | Shefet et al. | 425/32 |

* cited by examiner

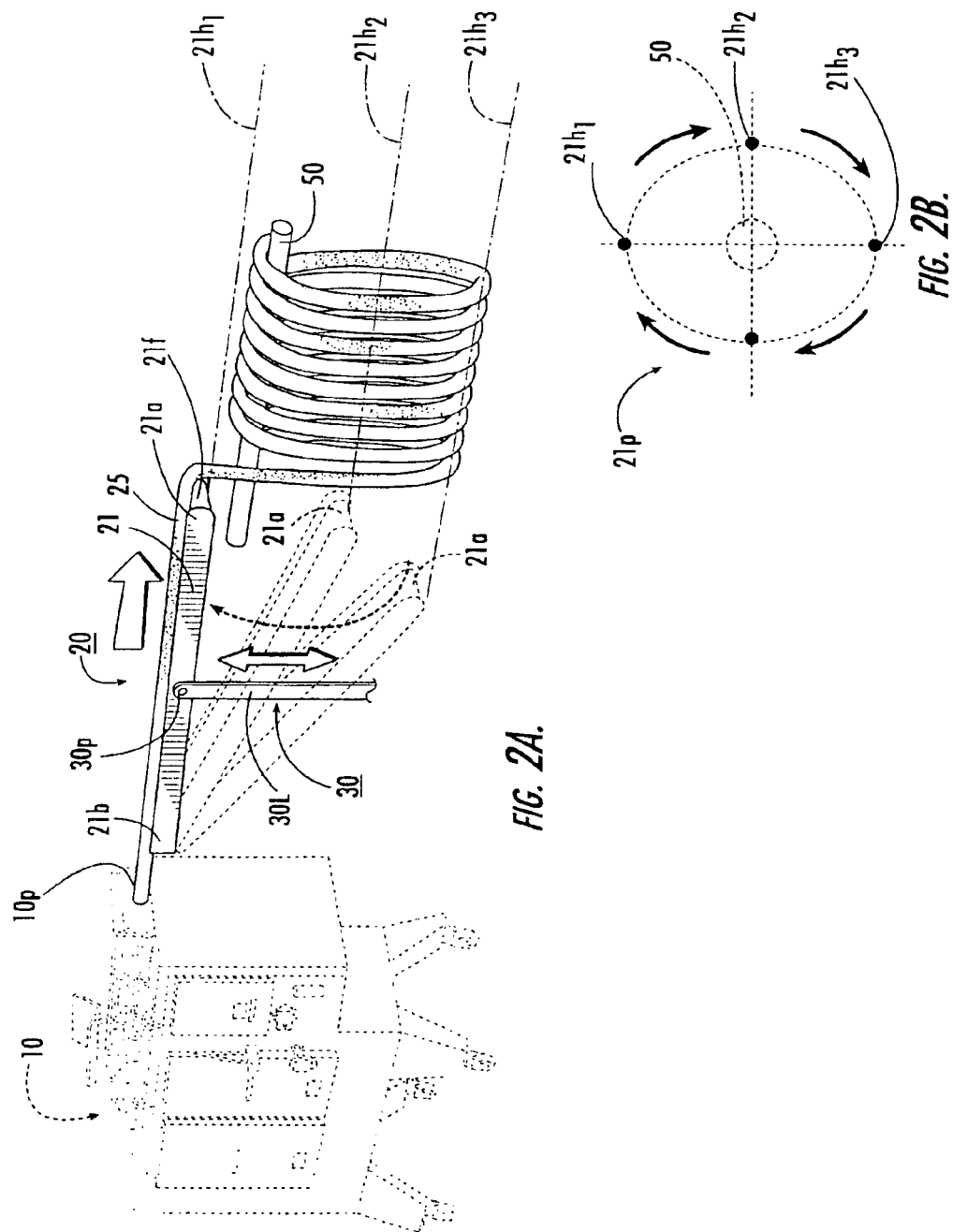

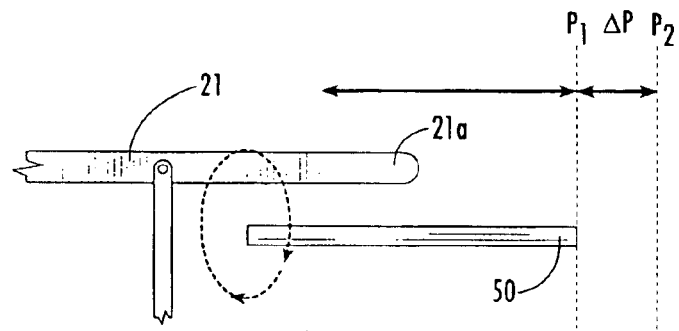
FIG. 3A.
FIG. 3B.
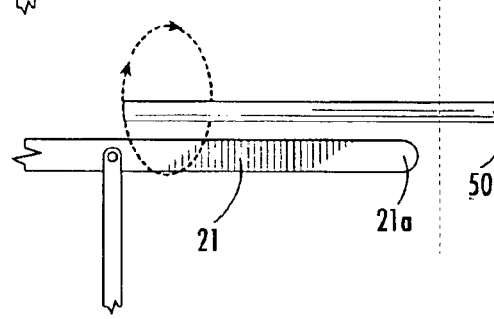
FIG. 4.
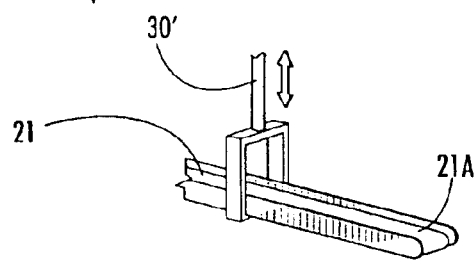
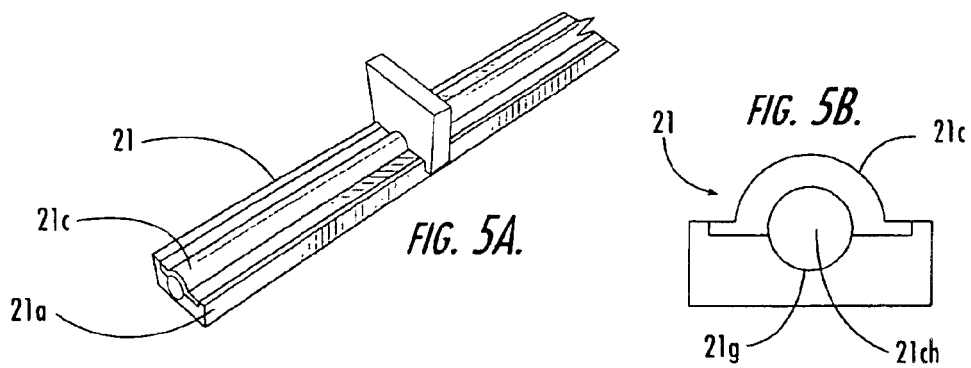
FIG. 5A.
FIG. 5B.

AUTOMATED LOADERS OR WINDERS AND RELATED SYSTEMS, DEVICES AND METHODS

RELATED APPLICATIONS

This application claims priority from U.S. Provisional Patent Application Ser. No. 60/362,375 filed Mar. 7, 2002, the contents of which are hereby incorporated by reference as if recited in full herein.

FIELD OF THE INVENTION

The present invention relates to movement or transfer of product within processing facilities and is particularly suitable for automated loaders of contiguous lengths of products such as extruded or stuffed food products in food preparation and production systems.

BACKGROUND OF THE INVENTION

Conventionally, extruded or stuffed food products such as, but not limited to, meats such as hot dogs, links, or sausages, can be processed so that the desired food material is mixed and prepared, then propelled through a "stuffer machine" that includes a stuffing nozzle, extrusion machine, or co-extrusion machine. In operation, as the food moves through the stuffing nozzle or extrusion head, a natural or synthetic casing is disposed about and/or deposited or wrapped around the external surface of the food material to form a continuous length of encased elongated food product. To form certain products (such as hotdogs and sausages), the casing can be one or more of twisted, tied, and crimped at certain intervals forming a chain-like string or strand of encased food product. Extruders and co-extruders are available from various commercial manufacturers including, but not limited to Townsend Engineering Co., located in Des Moines, Iowa. Stuffers are available from various commercial manufacturers including, but not limited to HITEC Food Equipment, Inc., located in Elk Grove Village, Ill., Townsend Engineering Co., located in Des Moines, Iowa, and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

After stuffing or extruding, the encased elongated food product is expelled from the stuffer or extruder via a material discharging exit port. FIG. 1A illustrates a conventional stuffer 10 and stuffer material discharge port 10p. The stuffer discharge port 10p is positioned proximate an "inker" or looping and transferring device 15 (FIG. 1B) that rotates an endless chain of hooks 15h about the discharge port 10p. Generally described, the material discharge port 10p is configured, so that during operation, the product is expelled and directed so that the traveling hooks each serially travel to be adjacent the discharge port 10p to catch a portion of the length of the product to thereby loop the product onto the hooks at certain intervals. Certain devices place the hooks below the discharge port 10p and the discharge port discharges into a downwardly inclined channel that directs the elongated food downward and, as the hooks turn to face the discharged food, the hooks sequentially individually reach out to grasp the product at certain intervals. Other devices propel the encased product onto hooks that rotate thereabout (typically under) to catch the product at certain intervals to transfer the encased material onto the transfer device. The hooks 15h then suspend the product in a looped configuration (hanging in a vertical orientation) as shown in FIG. 1B.

FIG. 1C illustrates a slightly different prior art stuffer 10 and associated linker 15 with hooks that are oriented to rotate in a different plane from that shown in FIG. 1A (i.e., a vertical plane rather than a horizontal plane). In addition, in this prior art stuffer/linker, the discharge port 10p terminates into a short expanse of tubing that forms a rotating discharge nozzle 10r. The rotating nozzle 10r, again, propels the extruded encased product onto the hooks 15h. After the product is suspended on the hooks 15h, a rod is typically manually inserted through the suspended looped product above the hooks and below the upper looped portion of the food, and the product is manually lifted up and off the hooks 15h and transferred to a trolley, oven, or other food processing station. Unfortunately, the propelling motion and/or the looping hooks may be arranged such that the product is not controllably released from the discharge port, thereby providing inconsistent or non-uniform lengths of suspended product and/or discharged segments that may miss their intended hook entirely. This may be particularly problematic for non-segmented strands (non-twisted or non-chain type of product).

In view of the foregoing, there is a need to provide food transfer means that can more controllably transfer looped strands of elongated items in an automated manner and or provide improved food transfer means that can wrap or loop elongated items.

SUMMARY OF THE INVENTION

The present invention provides an automated winder system, methods, and devices that can automate the loading of extruded or stuffed product onto a transfer support member such as a stick loader. The automated winders can be configured to remove the need for a hook-based continuous looping system, and/or manual insertion of rods to lift the looped product onto the rods, from the production process. Indeed, in particular embodiments, the automated winder can load the elongated product directly onto a stick or desired support transfer member that can then be used to transfer the product to (and/or through) the next processing station (such as a smoker, oven, curer or the like).

In certain embodiments, the automated winder is configured with an arm that extends a distance away from the discharge port. The arm is configured to repetitively translate a vertical distance so as to travel above and below a suitably aligned transfer member. The arm may be configured to move up and down and/or to rotate in a substantially circular, oval, elliptical, or other desired motion. Typically the generated motion is a closed loop path that has two different directions of travel, such as a motion that includes both x and y axis directional components. The transfer member may be configured to (linearly) translate as the arm translates (moved either forward or backward toward or away from the stuffer discharge port) so that the automated winder can wrap or loop the released product starting at one end portion of the transfer member and terminating at the opposing end portion so that substantially the entire length (or a desired length) of the transfer member is covered with a contiguous length of looped product.

In operation, the elongated item can be directed to travel on the arm a distance away from the discharge port, then to be released off the arm at an end portion thereof, and wrapped about the transfer member. In certain embodiments, the transfer member is a portable stick member upon, which the wrapped contiguous product is suspended in a looped arrangement, each loop having a substantially uniform length. The arm may include an enclosed or partially enclosed chute or channel configured and sized to allow the elongated item to move substantially unrestricted therethrough. In other embodiments, the arm has an open face and the product is directed to travel over the arm on the open face. An external environmental housing may be placed over a desired length of the arm. The arm may include a floor that is stationary or moves, or combinations thereof. In certain embodiments, the food support floor is defined by an endless conveyor, a shuttle conveyor, or a stationary surface or combinations of same.

Certain embodiments of the present invention are directed to methods for loading, winding, or looping an elongated item onto a receiving member, such as a stick member. The method includes: (a) receiving a contiguous length of an elongated product onto an elongated arm, the elongated arm having opposing receiving and releasing end portions; (b) moving the elongated arm to cause it to move in a repetitive motion; (c) directing the elongated product to travel forward a desired distance over the elongated arm during the moving step; (d) positioning a transport support member (such as, but not limited to, a stick member) in alignment with the elongated arm during the moving step; and then (e) translating the stick member toward or away from the end portion of the elongated arm as the elongated product is released from the releasing end portion of the elongated arm thereby winding the elongated product directly onto the stick member so that the elongated product is arranged in a looped configuration thereon.

Other embodiments are directed to an automated winder for an elongated product. The automated winder includes an elongated arm having an associated length and opposing first and second end portions. In position, the first end portion is adapted to receive an elongated item thereon from an extrusion or stuffer device located upstream of the automated winder. The second end portion is configured to release the elongated item therefrom after the item travels a desired distance over the length of the arm away from the extrusion device. The winder also includes a winding mechanism attached to the elongated arm a distance from the first end portion thereof. The winding mechanism is configured to cause the elongated arm to repetitively travel in a desired motion pattern so that, in operation, the winding mechanism causes the arm to release the elongated item in a manner that winds the elongated item about a suitably aligned transfer support member.

Still other embodiments are directed to automated winder systems. The systems can include at least one elongated transfer support member having a length and sized and configured to hold a looped arrangement of an elongated product thereon and an automated winder configured to be cooperably positioned and aligned with the discharge port of an extrusion or stuffer device configured to discharge elongated product therefrom. The automated winder includes an elongated arm having an associated length that is longer than the length of the transfer support member. The elongated arm having opposing first and second end portions. In position, the first end portion is adapted to receive an elongated item thereon from the extrusion or stuffer device. The second end portion is configured to release the elongated item therefrom after the item travels greater than a major portion of the length of the arm in a direction that is away from the extrusion device. The arm is positioned in spaced apart cooperating alignment with the transfer support member. The winder also includes a winding mechanism attached to the elongated arm. The winding mechanism is configured to cause the elongated arm to repetitively travel in a desired motion so that, in operation, the winding mechanism causes the elongated product to wind about the transfer support member as it is released from the second end portion of the arm.

In particular embodiments, the transfer support member is linearly translated away from the extrusion or stuffer device during operation so as to receive the wound product over a desired length of the support member. The wound product may be arranged in substantially uniform looped lengths so as to hang suspended from the transfer support member. The system may be arranged so that over a desired time period, the winder is substantially continuously operated to load a plurality of transfer support members that are serially aligned with the arm for a desired interval of time so as to successively transfer and wind elongated product thereon. Further, in certain embodiments, the transfer support member is a stick or rod that can be used to support the elongated product at the next active workstation that may be an oven, a smoker, a curer, or other food preparation/processing station.

These and other objects and aspects of the present invention are explained in detail in the specification set forth below.

BRIEF DESCRIPTION OF THE DRAWINGS

FIG. 2A is a side view of a portion of an automated winder according to embodiments of the present invention.

FIG. 2B is a schematic illustration of an exemplary motion pattern of the arm of the automated winder of FIG. 2A according to embodiments of the present invention.

FIG. 3A is a schematic illustration of a portion of the automated winder illustrated in FIG. 2A showing the winder arm above the loading stick or receiving member.

FIG. 3B is a schematic illustration of a portion of the automated winder illustrated in FIG. 2A showing the winder arm below the loading stick or receiving member.

FIG. 4 is a partial perspective view of a portion of the winder arm of the winder of FIG. 2A with the winding mechanism attached above the winder arm according to embodiments of the present invention.

FIG. 5A is a top perspective view of a portion of a winder arm illustrating an enclosed chute or channel according to embodiments of the present invention.

FIG. 5B is an end view of the winder arm shown in FIG. 5A.

DESCRIPTION OF EMBODIMENTS OF THE INVENTION

Figure 1A:
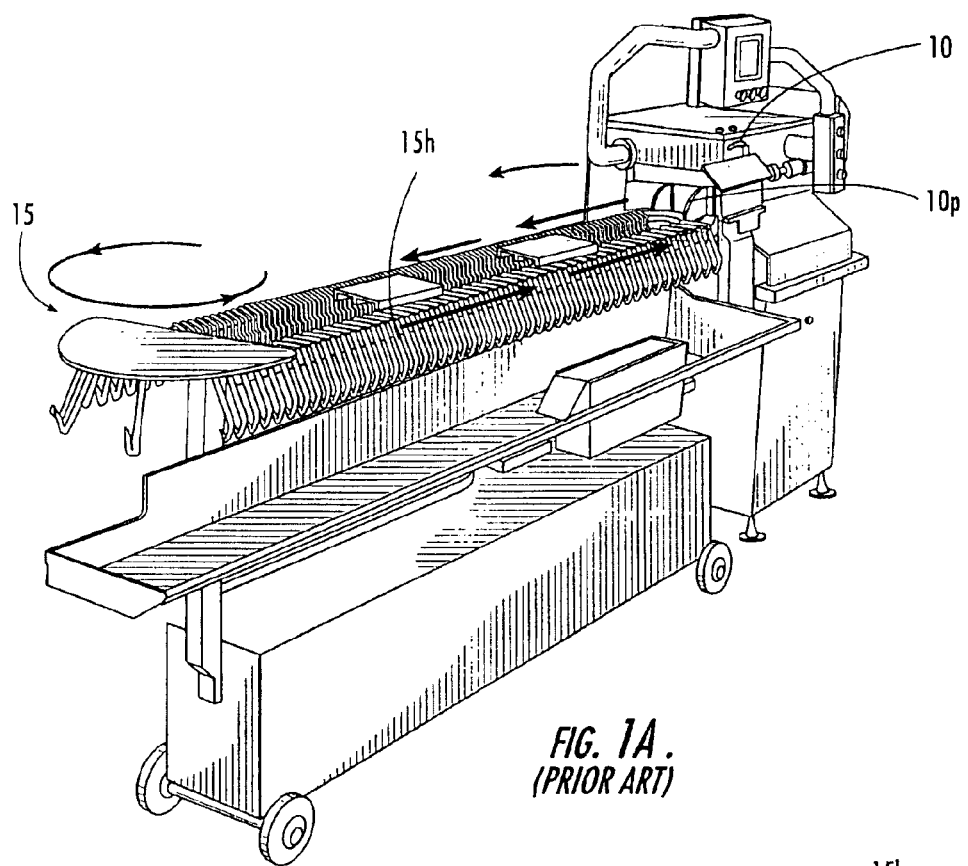
FIG. 1A is a perspective view of a prior art extruded food stuffer and associated linker or transferring and looping device.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations. The sequence of operations (or steps) is not limited to the order presented in the claims unless specifically indicated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The automated winders of the present invention may be particularly suitable to wind or load elongated food items from one station to a support member that can be used to transport the elongated food items to the next desired work station. Elongated food items include, but are not limited to, elastic or partially elastic food items such as cheese (e.g., mozzarella strands), dough (for incubation), meat sticks or strands, licorice or other strands of candy, and meat products. Of course, the processing system can be configured to wind or transfer other items. For example, other elongated products include candles, ropes, cables, wires, hose, tubing, and the like.

In certain embodiments, the present invention is used to process or transfer and load a length of an elongated extruded product held in a casing. The casing can be any suitable casing (edible or inedible, natural or synthetic) such as, but not limited to a collagen, cellulose, plastic, elastomeric or polymeric casing. The elongated product can be an elongated meat product. Exemplary meat products include, but are not limited to, strands of meat (that may comprise pepperoni, poultry, and/or beef or other desired meat), processed meat products such as strand(s) or contiguous lengths of meat sticks (including whole or partial meat mixtures), sausages, hotdogs, and the like.

The elongated product can be configured as a contiguous or continuous length of product having a length of at least about 20–25 feet per strand, and typically at least about 50 feet. The elongated product may be segmented or non-segmented, i.e., a length of chain-like linked items; or a length of non-chain linked product.

The elongated food item may be elastic (at least in tension) so as to allow some stretching without unduly altering or deforming its desired shape and/or cross-section during processing. The elongated food item may be an extruded product that is held in a natural or synthetic casing as noted above. Other embodiments contemplate product with rigid configurations but movable link to link such as chains of material having sufficient rigidity to retain its shape during processing and/or use (formed of a solid or composite metal, polymer, and/or plastic and the like).

In operation, in certain embodiments, the elongated product may have an exterior surface that exhibits increased friction relative to a finished, cured, or dried configuration. For example, a processed meat mixture that is held in a collagen casing, prior to finishing, can be described as having a relatively gelatinous, sticky external residue that can cause the food to attempt to stick to a floor or support surface.

Turning now to FIG. 2A, one embodiment of an automated winder 20 is shown. The automated winder 20 includes an elongated arm 21 with first and second opposing end portions 21a, 21b, respectively, and a winding mechanism 30. In this view, the winding mechanism 30 is schematically illustrated by a translation linkage 30L that is attached to the arm 21 in a manner that allows it to repetitively move the arm 21 in a desired translating motion or pattern. At the other end of the translation linkage 30L can be any number of suitable translation generation means as will be appreciated by those of skill in the art. As shown, the arm 21 directs the elongated product 25 onto a desired transport support member 50 (shown as a stick or rod). In operation, a plurality of support members 50 are serially placed in aligned cooperating position with the arm 21 of the winder 20 so that each support member 50 can be successively loaded or wound with looped elongated product 25.

In certain embodiments, the winding mechanism 30 is configured to provide a motion for the arm 21 that includes at least a substantially continuous or repeating up and down motion as indicated by the solid line arrows positioned proximate the translation linkage 30L. Additionally, the winder mechanism 30 may also be configured to translate in a more complex, multi-directional motion (as indicated by the broken-line arrows shown adjacent the solid-line arrows, the motion may also be include movement that is directionally in and out of the paper "the Z axis"). Thus, as shown by the dotted line arrows adjacent the solid line arrows, the translation linkage 30L may drive the arm 21 to move in a direction which is a closed path including two different axis of travel, typically including both X and Y axis directional components. The closed path may be shaped in any desired suitable configuration, including, but not limited to, an oval, teardrop, circular, elliptical, hourglass, square, or rectangle, so as, in operation, it causes the elongate product to wrap to the desired configuration. Further the winding mechanism 30L may be programmably configured to alter its winding pattern, winding speed, and the like, depending on the product being processed.

By way of illustration, as shown in FIG. 2B, the arm 21 has a maxima position at a first vertical height $21h_1$, two intermediate positions at a second lesser height $21h_2$ (shown with the arm 21 in dotted line below the maxima height), and a minima position $21h_3$ at still a lesser vertical height (shown with arm 21 at yet another lower position at a minima height). The arm 21 is configured to move a sufficient distance above and below the transport member 50 so as to load or loop the elongate product 25 thereon.

FIG. 2B illustrates but one embodiment of a rotational motion pattern 21p for the arm 21 in which the arm 21 successively moves through a closed path pattern. In certain embodiments, as shown in this figure, the pattern 21p may be substantially elliptical or oval. In this pattern, the arm 21 travels through the intermediate positions both as it is moved and/or rotated in the closed path in the downward and upward directions. In position, the transport member 50 is located within the perimeter of the enclosed closed travel path defined by the translating arm 21. In certain embodiments, the transfer member 50 can be located so that it is centrally located within the boundary of the movement of the arm. In other embodiments, the transfer member is asymmetrically positioned (such as closed to the top, bottom or one side of the arm movement). The direction of travel is shown as clockwise in FIG. 2B, but may be configured to be counterclockwise as well.

Figure 1B:
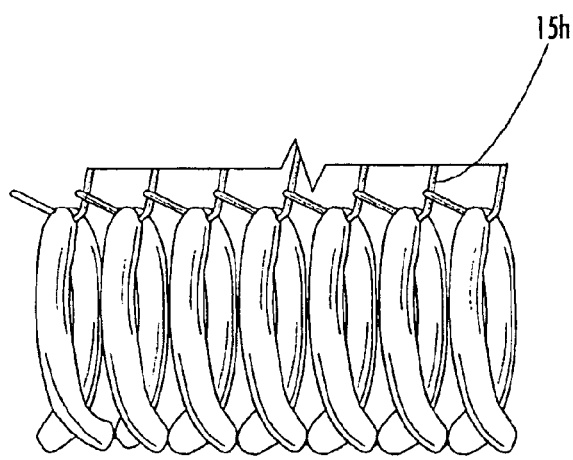
FIG. 1B is an enlarged view of the looping hooks of the device shown in FIG. 1A showing an elongated extruded encased food product suspended thereon.
Figure 1C:
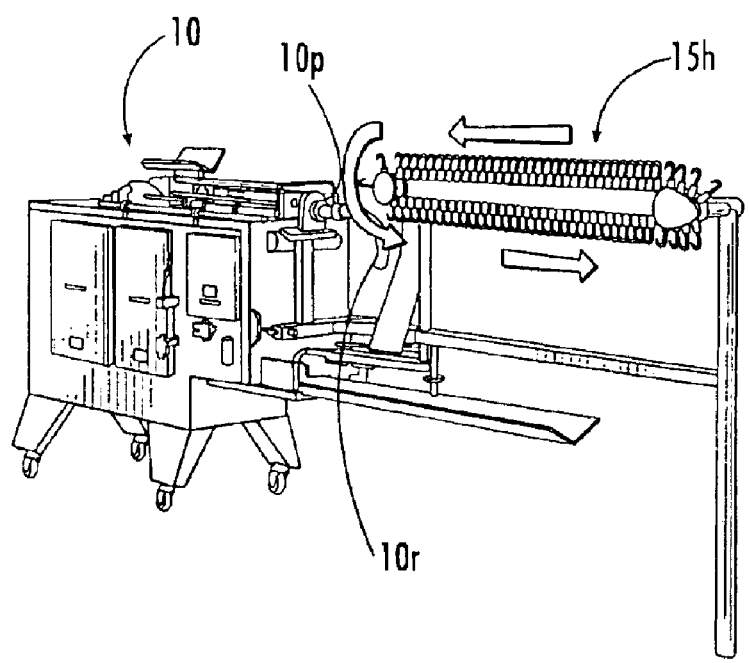
FIG. 1C is a perspective view of another prior art stuffer and linker.

FIG. 2A shows that the first end portion 21a of the arm is positioned a length away from the discharge port 10p of the upstream processing station. As shown, the upstream processing station can be the extruder 10 (such as the conventional extruders shown in FIGS. 1A–1C) and the second end portion 21b of the arm is positioned proximate to, and in cooperating alignment with, a discharge port 10p of the extruder (or stuffer) 10 or intermediately positioned member such as a chute. That is, the second end portion of the arm 21b is positioned so as to receive the elongated product 25 from the upstream device and the opposing (first) end portion 21a is configured to release the elongated product 25 after the product 25 has traveled a desired distance over the length of the arm 21. Typically, the product 25 will travel a major portion of the length of the arm, and more typically, substantially the entire length of the arm 21 before it is released. The product 25 can be released directly from the first end portion 21a, or a discharge nozzle or other discharge port can be attached to the arm 21 and used to dispense the product 25 therefrom.

In operation, the transfer member 50 can be configured to start at a first position that is toward the upstream end 21b of the arm 21 and during loading is gradually retracted or translated to be closer to the downstream end 21a of the arm 21 all at substantially the same vertical height (as shown by the horizontal arrows adjacent the transport member 50 in FIG. 2A). This motion distributes looped product over the desired length of the transport member 50. FIGS. 3A and 3B illustrate the winding translation of the arm 21 with respect to the transport member 50. The transport member 50 is located at a first position $P_1$ and is gradually moved forward to a second position $P_2$ as the arm 21 winds the product 25 thereon. Thus, the transport member 50 moves a distance $\Delta P$. In certain embodiments, the transport member 50 moves at a substantially constant speed or increments of travel distance that is synchronized and/or responsive to one or more of the speed of the winding (speed of the arm), the speed of forward movement of the product 25 as it exits the arm 21, and the desired looping arrangement/configuration (length of the loops) on the transport member 50. In certain embodiments, the movement of the transport member 50, the winding speed of the arm 21, and/or the speed of the elongate product 25 as it moves off the arm, can vary to provide variable loading density or looping lengths. Thus, the movement distance and speed of movement of the transport member 50 can vary depending on the desired loading of the transport member and winding speed and loop configuration (length, etc.). Typically, the transport member 50 moves a distance that corresponds to a substantial portion of its length (i.e, greater than about 51–75%). Although described as starting from a rearward position and moving forward, the transport member 50 can be configured to move in the reverse direction also.

The length of the arm 21 can vary depending on various factors, such as, but not limited to, the size of the product, the forward speed of the product, the desired winding pattern and the like. In certain embodiments, the length of the arm 21 is sized to be at least the length of the transport member 50. In other embodiments, the length of the arm 21 is such that the elongate product 25 travels at least about 2–8 feet, and typically at least about 6 feet, before being discharged therefrom onto the support member 50.

Figure 6:
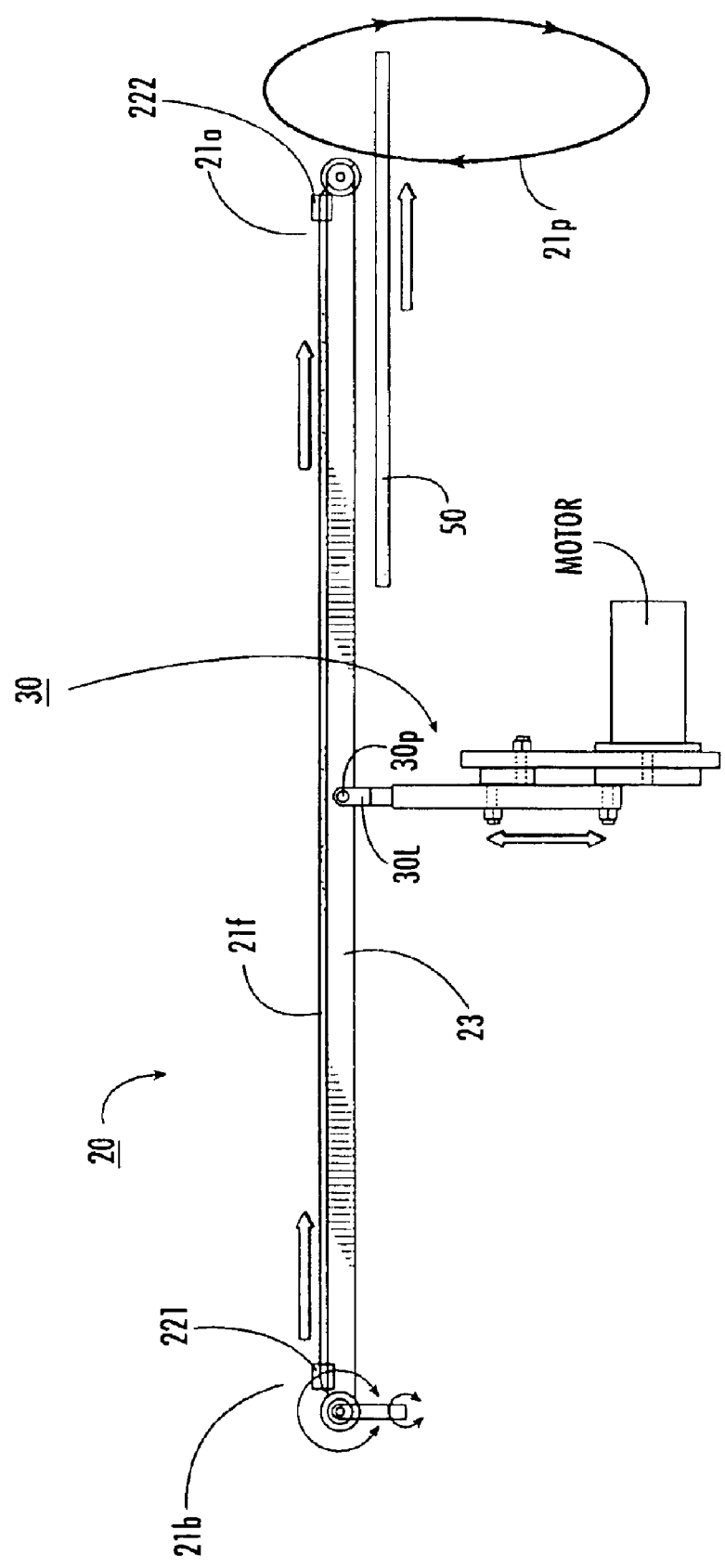
FIG. 6 is a side view of an automated winder system illustrating the winder attached below the winding arm according to embodiments of the present invention.
Figure 8:
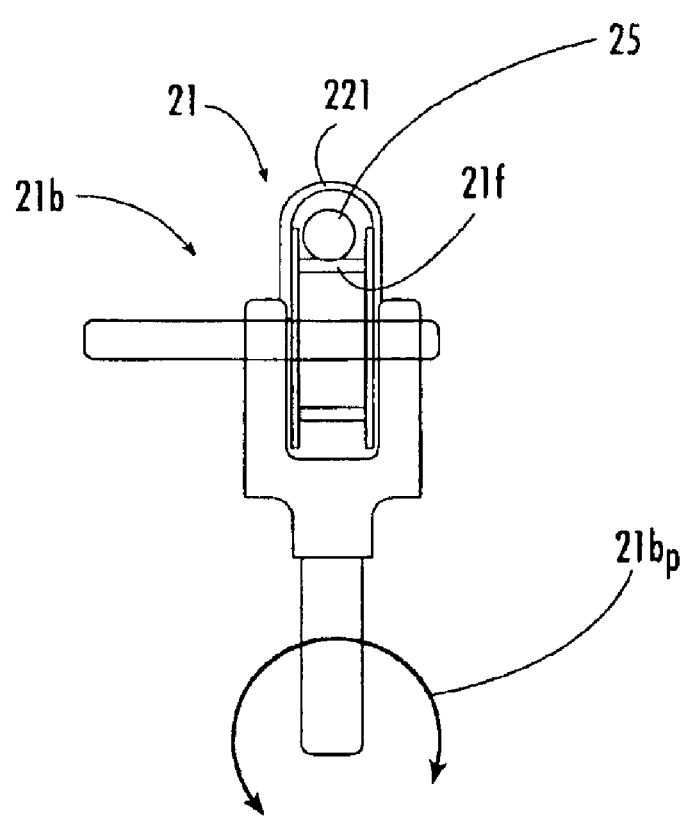
FIG. 8 is an end view of the winder arm shown in FIG. 6.

The automated winder 20 may be configured to be self-supporting or freestanding and portable or free-standing and secured to the production floor relative to the related upstream and/or downstream equipment, as desired. In other embodiments, the second end portion 21b of the arm can be attached to the extruder or upstream device 10 so as to be in communication with the discharge port 10p. As such, the second end portion 21b is stationary but can be pivotally attached to the device 10. In certain embodiments, the second end portion 21b is mounted so as to be able to move bi-directionally; the mounting or attachment can be configured in any suitable manner, such as, but not limited to, a universal joint, ball joint, bearing, elastomeric joint, and the like. FIG. 8 illustrates an end view of one embodiment of the arm 21 with an end portion 21b configured to be mounted to an extruder or other upstream-positioned device. As shown, the end portion 21b is configured to be affixed to a device 10 so that it is stationary or fixed in place but allowed to translate in a bi-directional manner in response to forces introduced by the movement of the arm 21 as it, in turn moves in response to forces introduced by the winding mechanism 30 (FIG. 6).

The arm 21 can be any desired shape or configuration. The arm 21 includes a floor 21f that supports the elongate product 25. The floor 21f can be stationary or moving, or combinations thereof. For example, the floor 21f can comprise rollers, low-friction coatings or surfaces, a conveyor belt(s), and the like. In certain embodiments, the floor 21f is defined by an endless conveyor 23 (FIG. 6) that wraps around the arm 21 to continuously convey the product 25 forward and then return to the starting position by traveling back underneath the floor 21f. As shown in FIG. 5B, the arm 21 can include a channel or chute 21ch that is configured with a shape that complements the elongated product 25. For example, for a substantially circular cross-section product 25, the floor 21f may include an arcuate or semicircular channel 21ch formed into the floor that is configured to receive a portion of the perimeter of the body of the product therein. In certain embodiments, the channel 21ch may be sized to be slightly larger, i.e, have a sectional height and/or width that is about 0.1–10% greater, than the height and/or width of the product 25. The channel 21ch may be formed over all or portions of the length thereof. The elongate product 25 can be held in the channel 21ch as it travels over the length of the arm 21.

As shown in FIGS. 5A and 5B, the arm 21 may include a cover member 21c that covers the floor 21f and encloses the elongate product 25 therein. In certain embodiments, the channel 21ch and the cover 21c may be formed from two or more matable shell members or, alternatively from a housing or a conduit that is positioned on the arm 21 to define an enclosed channel 21ch. The cover 21c may be transparent or translucent or include viewing windows along the length thereof so that a machine or operator may view or inspect product flow at desired points (or substantially all or all of the travel path). The cover 21c may be formed of a solid material. In other embodiments, a permeable or mesh-like cover (not shown) can be used.

Various automated detectors can be placed at desired locations along the arm to verify proper operation and to render an alert when an abnormality is indicated. Examples of such detectors include optical detectors (infrared or otherwise that respond to changes in visual intensity or generated light beams), flow meters, pressure meters, temperature sensors, and the like.

As shown in FIG. 2A, the winding mechanism 30 is configured to approach the arm 21 from the lower or bottom surface. As such, the winding mechanism 30 can be attached, directly or indirectly, to one or more of the bottom side (lower primary surface) and/or one or more sides (minor surfaces) of the arm 21. FIG. 4 illustrates that the winding mechanism 30' may alternatively be mounted to approach the arm from the topside. As such, the winding mechanism 30' can be configured to suspend the arm 21 and may be attached, directly or indirectly, at the upper primary surface and/or one or more sides of the arm 21. Still other embodiments can be configured so that the winding mechanism 30, 30' is attached via one or more end portions 21a, 21b, of the arm (not shown). Combinations of the attachment configurations noted above may also be used.

Referring to FIGS. 2A and 6, the winding mechanism 30 may be attached at an intermediate position at one or more attachment locations, the attachment locations being a distance away from each of the first and second end portions 21a, 21b. Although the winding mechanism may be attached to the arm 21 at any desired length from the respective end portions 21a, 21b, in particular embodiments, the winding mechanism 30 is attached at a primary pivot location that is located inward of the ends of the arm, typically at a location that is inward at least about 20% of the length of the arm (away from each of the ends of the arm). The term "primary pivot location" describes the location on the arm 21 at which the winding mechanism drives the repetitive motion of the arm. It can be a single point contact, a plurality of points, or a region or regions, depending on the configuration of the winding mechanism itself. The attachment position/configuration, the length of the arm, and the weight of the arm and product may influence the amount of physical movement needed by the winding mechanism 30 to generate the desired translation at the end portion 21a of the arm.

FIG. 6 illustrates one embodiment in which the winding mechanism 30 is attached at a primary pivot location 30p that is approximately centrally located between each of the opposing ends of the arm 21. That is, it is located to be within about 10% of the middle location of the arm 21. In certain embodiments, as shown, the arm 21 may also include an initial enclosed entry port 221 (FIG. 8) that is configured to direct the elongated product to travel in its desired substantially linear travel path over the arm 21. Similarly, the arm 21 may include an exit block member 222 that inhibits through passage of the elongated product 25 thereby facilitating the sideward (discharge) of the elongate product 25. In other embodiments, the pivot or winding mechanism 30 can be located closer to the discharge port, i.e., proximate to or adjacent the product inlet port 21b, this position may allow the arm 21 to be shortened (not shown).

Figure 7:
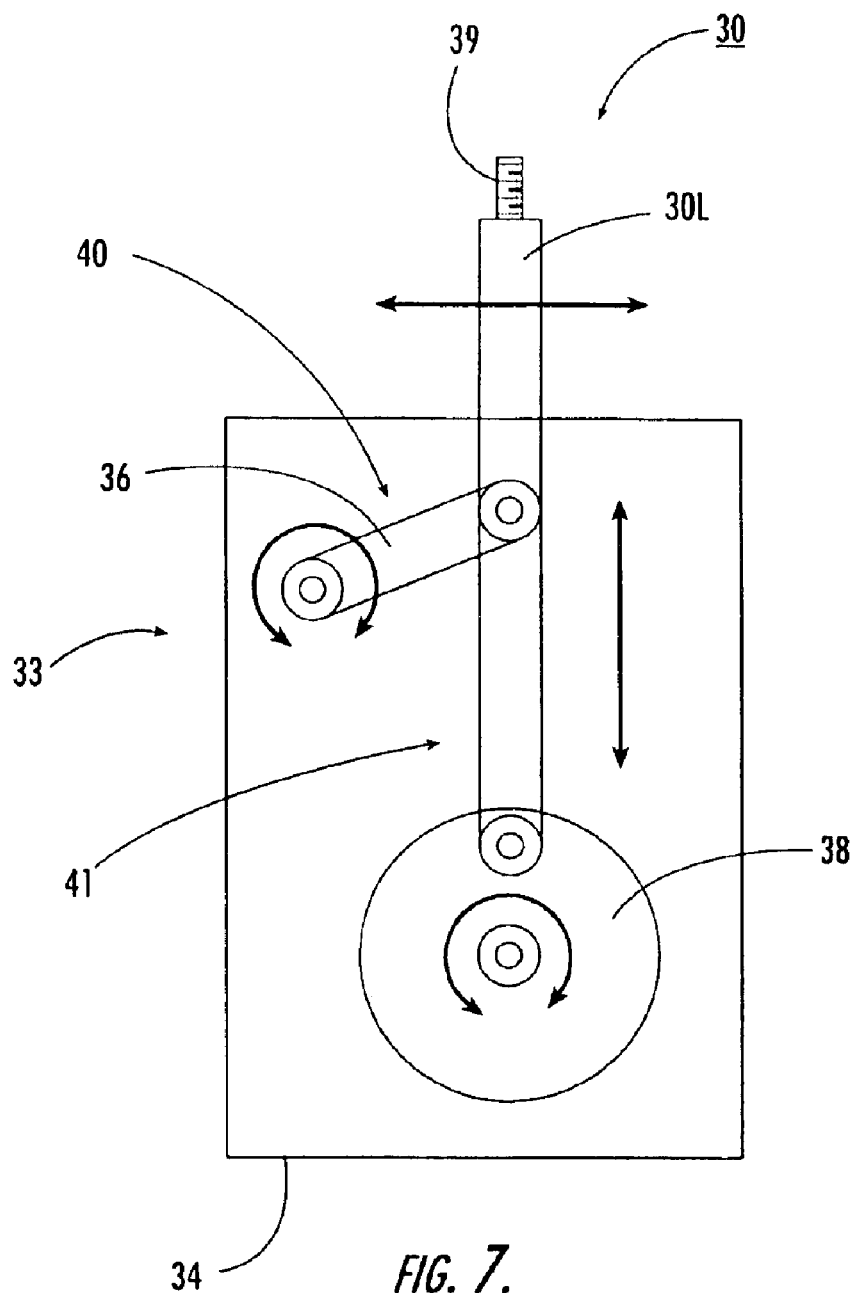
FIG. 7 is an end view of the winding mechanism shown in FIG. 6.

Referring to FIG. 7, an exemplary embodiment of a winding mechanism 30 is shown. This figure is a side view of the device shown in FIG. 6. In this embodiment, the winding mechanism 30 comprises a four-bar linkage 33 that is mounted on a stationary mount bracket 34. The four bar-linkage 33 includes a pivotably mounted rotating link 36, and a stationary mounted wheel 38, a center linkage 30L that is pivotably attached to both the pivotably mounted link 36 and the stationary mounted link 38. In operation, the link 36 and the center link 30L define a minor axis of motion control 40 while the wheel link 38 and the center link 30L define a major axis of motion control 41. The center linkage 30L can include upwardly extending threads 39 that can be used to attach the winding mechanism (directly or indirectly) to the arm 21.

The wheel 38 can be driven by a gear or shaft (not shown) to automatically turn the wheel 38 at a desired speed (constant and/or variable). Generally described, as the wheel 38 turns, the center link 30L follows the rotation of the wheel 38, making the center link 30L move both laterally (indicated by the side-to-side arrows in the upper portion of the linkage) and vertically (indicated by the vertical arrows) all the while limited by the pivotably attached link 36 that limits the lateral motion of the center linkage 30L. In this way, the winding mechanism 30 causes the arm 21 to travel through a repetitive substantially elliptical pattern 21p as shown in FIG. 6. Of course any suitable winding mechanism can be employed, including, but not limited to, cam/follower arrangements, pistons (pneumatic or hydraulic), combinations of linkages and any of the above as well as other electromechanical configurations that can generate the desired repeated winding motion.

FIGS. 9A–9D illustrate another embodiment of a winder 20'. As shown, the arm 21 has two spaced apart floor support mounting brackets 121, 122, a first one 121 positioned proximate the second end portion 21b of the arm and another second one 122 positioned upstream of the first one 121. The first mounting bracket 121 has a junction member 125 that is pivotably mounted to two upwardly extending arms $121_1$, $121_2$. The junction member 125 supports the arm 21 while cooperating with the winding mechanism 30 so that it allows the arm 21 to move in a multidirectional manner in response to movement of the arm as driven by the winding mechanism 30.

Figure 9A:
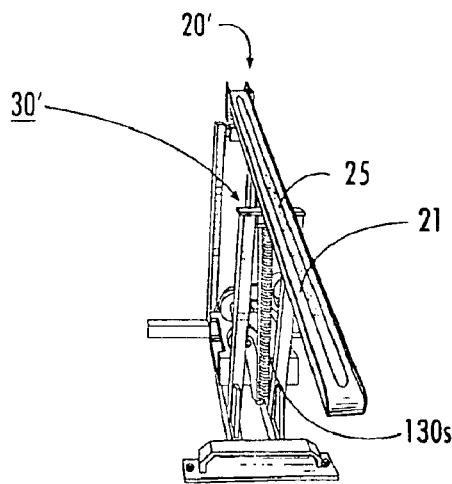
FIG. 9A is a perspective view of an alternative embodiment of an automated winder according to the present invention.
Figure 9B:
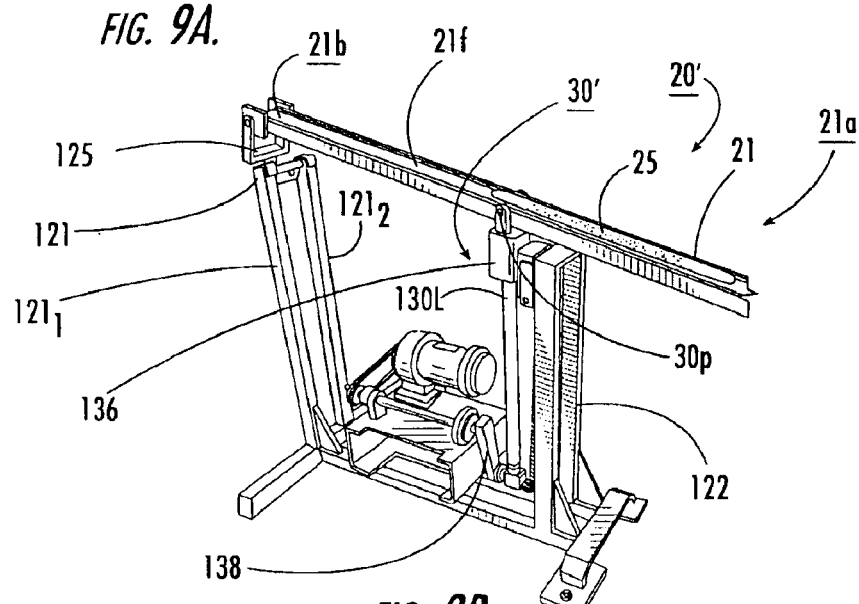
FIG. 9B is a side perspective view of the device shown in FIG. 9A.
Figure 9C:
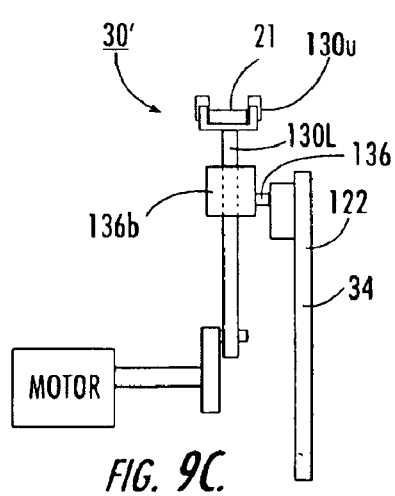
FIG. 9C is a schematic end view of the device shown in FIG. 9A.

FIGS. 9B and 9C show that the winding mechanism 30' is attached to the arm 21 at a primary pivot region 30p that is upstream of the first floor support mounting bracket 121. The primary pivot region 30p is at the attachment position of the winding mechanism linkage 130L to the arm. As shown in FIG. 9C, the linkage 30L includes a fork-like upper portion 130u that spans the width of the arm 21 and attaches to opposing sides thereof. Similar to the embodiment shown in FIG. 7, the winding mechanism 30' shown in FIGS.

9A–9G causes the arm to move in a substantially elliptical rotational movement pattern. In this embodiment, the winding mechanism 30' includes a vertically elongate linkage 130L (such as a piston or rod) that slidably moves through linkage 136 proximate the upper portion of the vertically elongate linkage 130L and that is connected at the lower portion thereof to a rotational member 138. As shown by the arrows located adjacent the lower rotational member 138 in FIG. 9F, in operation, the clockwise rotation of member 138 forces the vertically elongate linkage 130L to move forward and downward and then rearward and upward relative to the arm 21. A counterclockwise arrangement may also be used. The movement of the vertically elongate linkage 130L is further limited or shaped by the movement of the upper linkage 136 that pivots side to side with respect to the arm 21 (indicated by the arcuate arrows proximate the upper link 136) as the linkage 130L slides through the block 136b that cooperates with the upper link 136. The upper link 136 is pivotably mounted to a block 136b and is mounted to the platform 122 via stationary mounting bracket 34. A spring 130s can be mounted to the platform 122 to help control and/or dampen the movement of the winding mechanism 30' and/or linkage 130L. As the linkage 130L is rotated by the lower linkage 138 it slides upwardly and downwardly through the linkage 136b that in response pivots in lateral direction relative to the arm 21 to cause the repetitive rotation cycle.

Figure 9D:
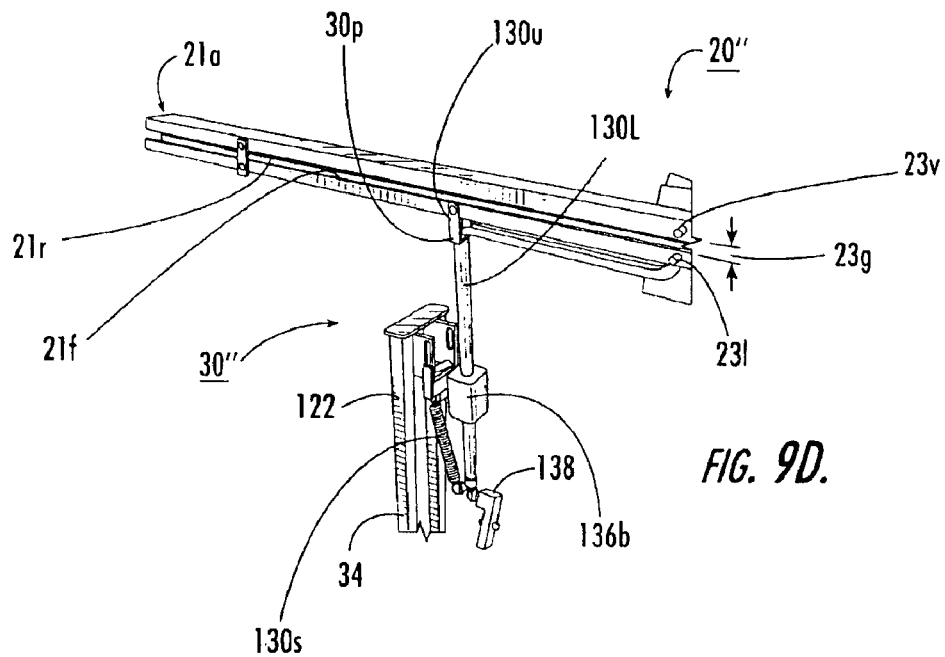
FIG. 9D is a side perspective view of the winding mechanism shown in FIGS. 9A–9B with the lower portion of the automated winder partially cut away.
Figure 9E:
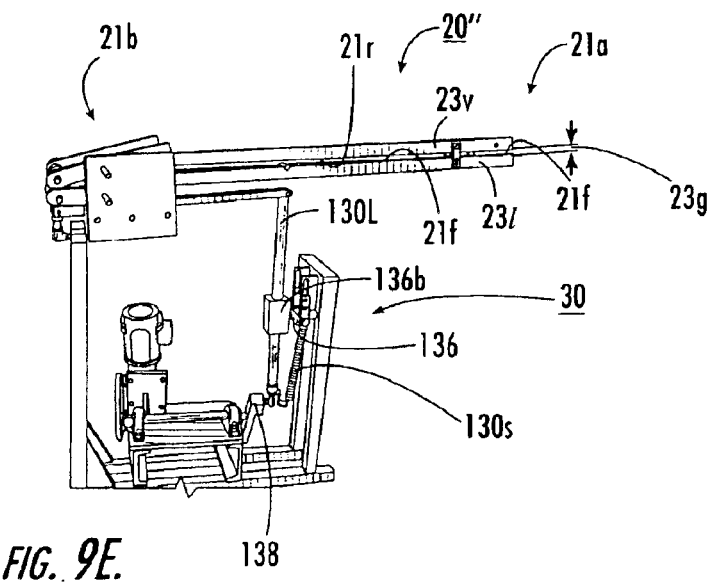
FIG. 9E is a side perspective view of a portion of the winder shown in FIGS. 9A–9B.

FIGS. 9D–9E illustrate an additional embodiment of the winding mechanism 20". This embodiment illustrates both a different floor or arm configuration (two overlying conveyors with an intermediate food travel path), and a variation on the winding mechanism linkage assembly.

Figure 9F:
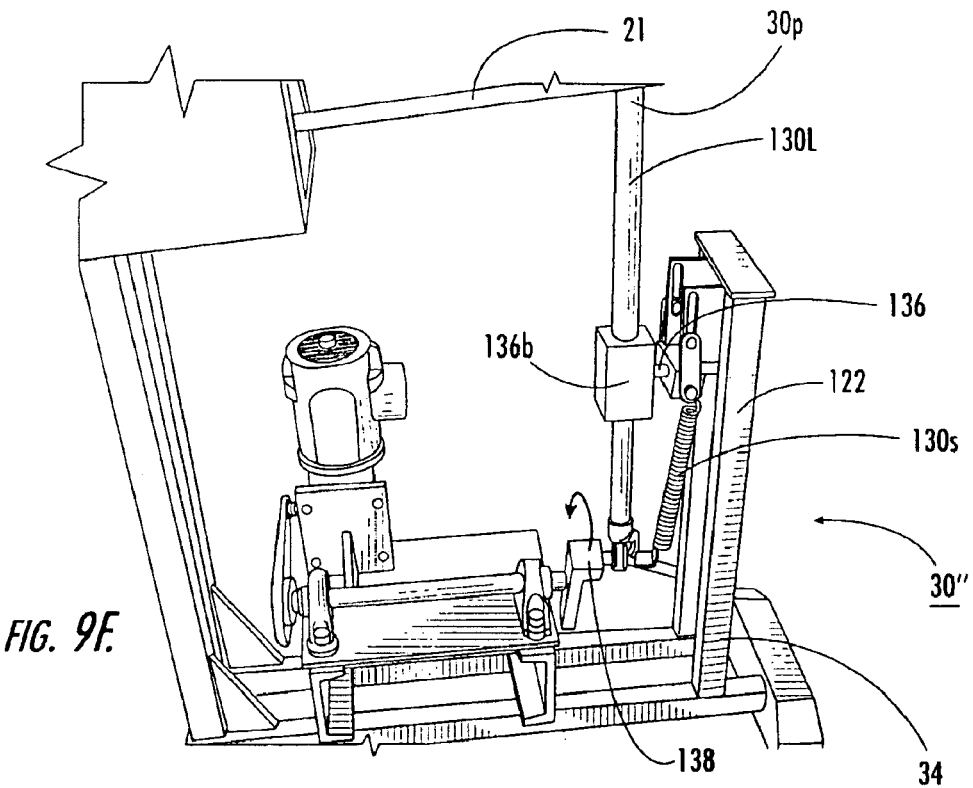
FIG. 9F is an enlarged side view relative to that shown in FIG. 9E.
Figure 9G:
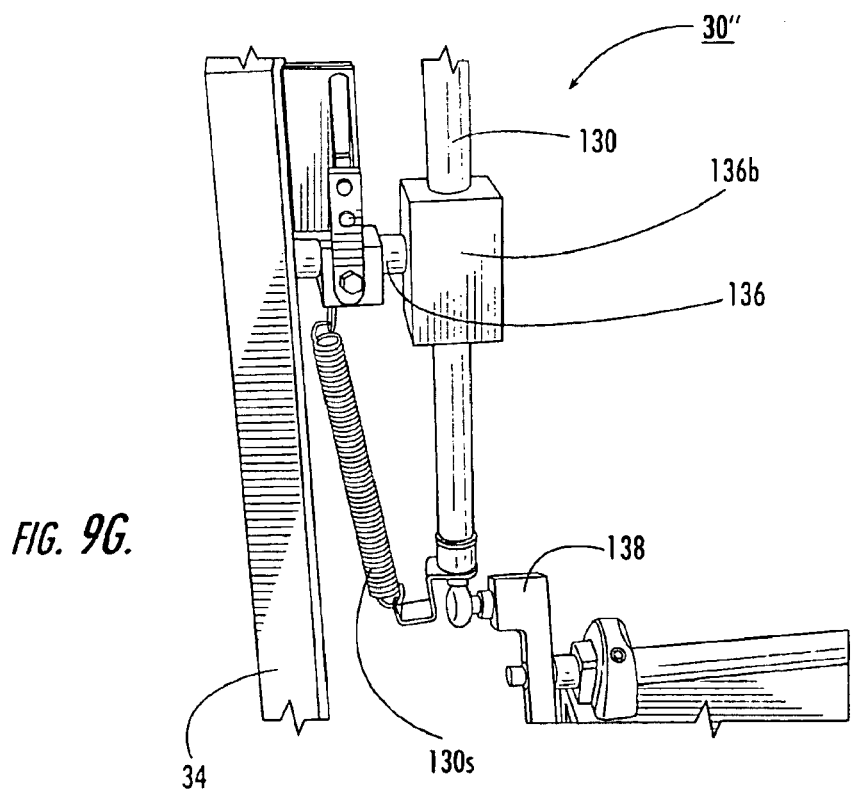
FIG. 9G is an opposing side view relative to FIG. 9F illustrating a portion the winding mechanism.

Referring to FIGS. 9D and 9G, an outer portion of the rotatable link 138 is shown attached to the lower portion of the link 130L. As the link 138 rotates, the elongated link 130L is directed to travel in a multidirectional motion (up and down and sideways). In operation, the rotatable link 138 is substantially constantly rotated or driven by an electric motor. One suitable motor is a ¼ HP 480V three-phase motor having about a 1750 rpm output with a 2.2 ratio.

In addition, as shown in FIG. 9F, the upper link 136 can be (pivotably) attached to the block 136b the link 136 can be (pivotably) attached to the platform 122 via a stationary mounting bracket 34. The spring 130s can be attached to the lower portion of the linkage 130L (proximate the connection to the rotatable link 138) on one end portion and the platform 122 (or bracket 34) at a location proximate the upper link 136 at the other end portion to help control/dampen and/or stabilize the motion generated by the winding mechanism 30".

FIGS. 9D and 9E illustrate an arm configuration that can employ two overlying aligned and vertically spaced apart surfaces that define a roof or ceiling 21r and a corresponding floor 21f. In certain embodiments, the roof 21r and/or floor 21f may be formed from one or more conveyors (shown as two spaced apart endless conveyors) 23u, 23l. The lower conveyor 23l defines the floor 21f for food or other item over the arm travel path. The two surfaces 21r, 21f that may be defined by conveyors 23u (roof), 23l (floor) can be spaced sufficiently apart so as to define a gap therebetween 23g. The gap 23g can be sized so as to allow both conveyor primary surfaces (those facing each other) to contact the food in opposing locations in a manner that does not deform the shape of the food as it travels between the two surfaces 21f, 21r and/or conveyors 23u, 23l, but sufficiently close so as to help guide the food in the travel direction. In other embodiments, the gap 23g may be such that the roof, ceiling, or upper conveyor resides a distance above the food. The two conveyors 23u, 23l may be configured to move at the same speed. In certain embodiments, the speed of the conveyors may be operated between about 2–10 ft/sec, and in particular embodiments, at about 6.5 ft/sec linear movement. The conveyors 23u, 23l may be set to vary speed during operation and may be in communication with a variable speed or frequency controller from AC Tech. The drive motor may be configured similar to that described above for the winder mechanism 30. Although described as two endless conveyors, other configurations can also be used. For example, the floor 21f and/or roof 21r can be formed from more than one conveyor. In other embodiments, the roof can be comprised from 2 or more conveyors creating a channel configuration having a triangle or other multi-sided configuration. The floor can also comprise a plurality of conveyors also defining a multi-sided shape (such as a triangle, open square, hexagon, and the like). In addition, portions of the floor and/or ceiling may be configured as stationary components. Combinations of the above may also be used.

In other embodiments, the floor 21f of the arm 21 can be configured as a "V" or "U" shape (using a conveyor surface formed in that configuration or a plurality of conveyors spaced and oriented to define the desired shape) (not shown) to help hold the food therein as it travels along the arm. Combinations of the above may also be used.

Figure 10A:
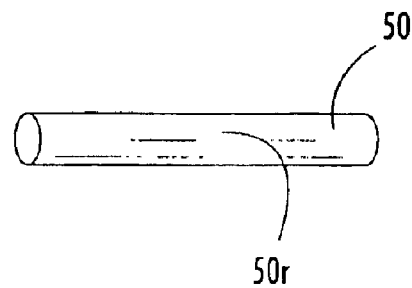
FIG. 10A is a front view of an example of a stick/rod as employed as a transfer support member suitable for loading with the automated winders of the present invention.
Figure 10B:
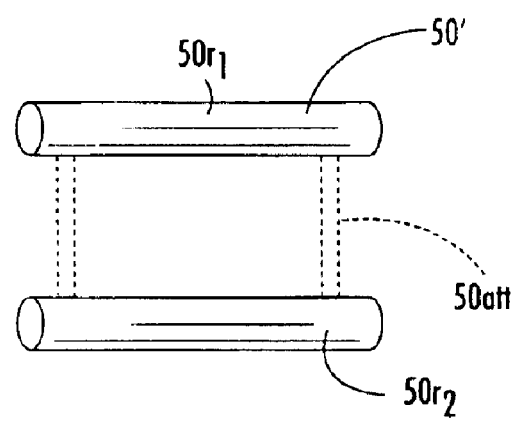
FIG. 10B is a front view of an alternative embodiment of a transfer support member according to the present invention.
Figure 10C:
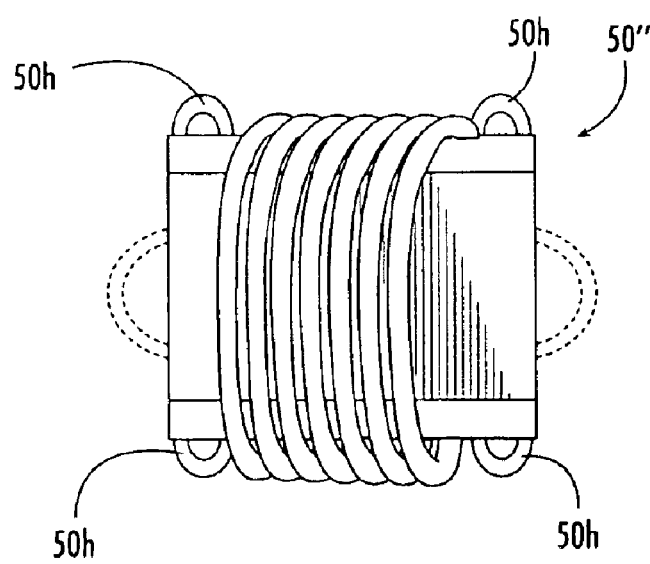
FIG. 10C is a front view of yet another alternative embodiment of a transfer support member according to the present invention.

FIGS. 10A–10C illustrate examples of particular embodiments of transfer support members 50. As shown in FIG. 10A, the food transport member 50 may be configured as rod or "stick" 50r. FIG. 10B illustrates that the food transport member 50' may be configured as a pair of separate rods or sticks 50r1, 50r2, that are vertically spaced apart and aligned. The two rods 50r1, 50r2 may be optionally attached as shown by the broken line 50att feature in FIG. 10B. In this embodiment, the winder arm 21 can be configured to travel through a winding path that has a sufficient vertical distance so as to encompass or encircle both of the rods 50r1, 50r2. FIG. 10C illustrates that the transport member 50'" can include a contiguous body or a shape or configuration that extends below the upper portion as there is no longer any requirement that the transport member be inserted into hooks to remove the suspended product therefrom. The contiguous body may be solid, perforated, forminated, or configured to reduce weight. Similarly, the transport member 50 may include one or more handles 50h or other externally accessible handling means disposed along the length and/or at selected end portions thereof to promote ease of handling to transport the loaded member to another active station. It will be appreciated by those of skill in the art that the present invention now allows a number of different configurations that that can act as suitable support members 50, 50', 50" and the present invention is not limited to the embodiments described herein. In addition, in operation, a plurality of transfer support members, of the same or different configurations, may be sequentially (manually or automated) serially loaded and removed by aligning them with the winder 20.

Figure 11A:
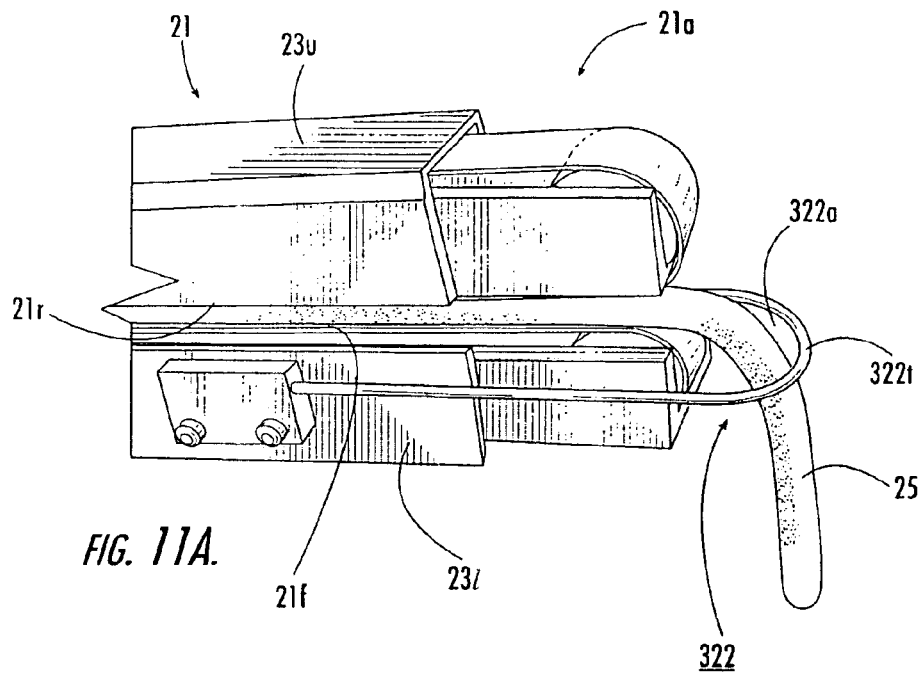
FIG. 11A is a side view of a discharge portion of the arm illustrating an end guide according to certain embodiments of the present invention.
Figure 11B:
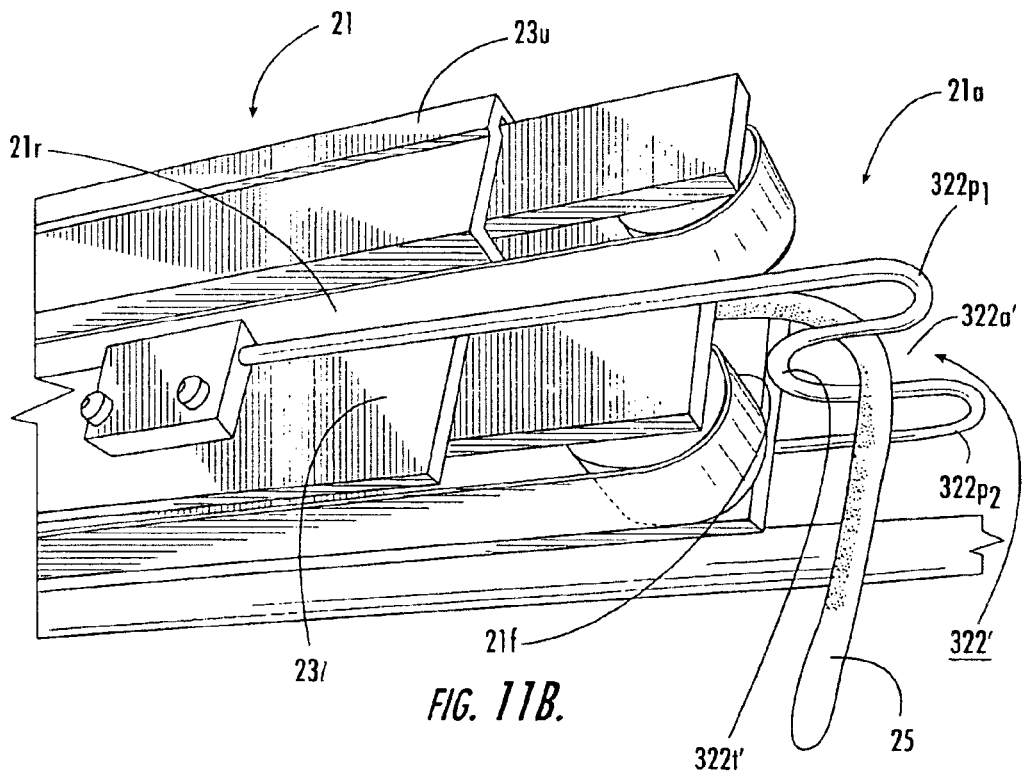
FIG. 11B is a side perspective view of an alternate configuration of an end guide according to certain embodiments of the present invention.

FIG. 11A illustrates that the distal end portion 21a of the arm 21 can be configured with an end guide 322 that helps to direct the movement of the food as it exits off the arm 21 during the winding operation as the arm moves in its desired winding motion pattern. In operation, the elongated item 25 (shown in broken line) travels through an aperture 322a defined by the end guide 322. The guide 322 may have an outer perimeter that is looped and defines a tongue 322t with an open center. FIG. 11B illustrates an alternate embodiment of an end guide 322'. The guide 322' includes an inwardly oriented tongue 322t' that defines the aperture 322a' and spaced apart prongs $322p_1$, $322p_2$. In this embodiment, in operation, the food 25 travels outwardly over the perimeter innermost portion of the tongue 322t. Other configurations of guides 322, 322' may also be used. The end guide 322, 322' is illustrated with the arm configuration that employs a ceiling or roof and floor 21f, 21r; however, the end guide 322, 322' is not limited thereto and may be used with any desired arm configuration. In certain embodiments, the end guide 322, 322' may be positioned proximate to and substantially vertically aligned with the floor 21f. In other embodiments, the end guide 322, 322' may be configured to extend outwardly at a vertical level that is below the floor 21f. In yet other embodiments, the end guide 322, 322' may be configured to rise above the floor 21f.

Figure 12A:
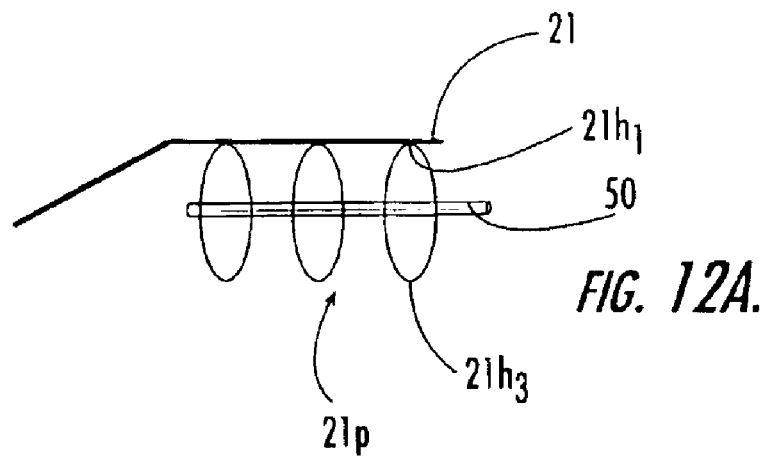
FIG. 12A is a schematic of a winding pattern according to embodiments of the present invention.
Figure 12B:
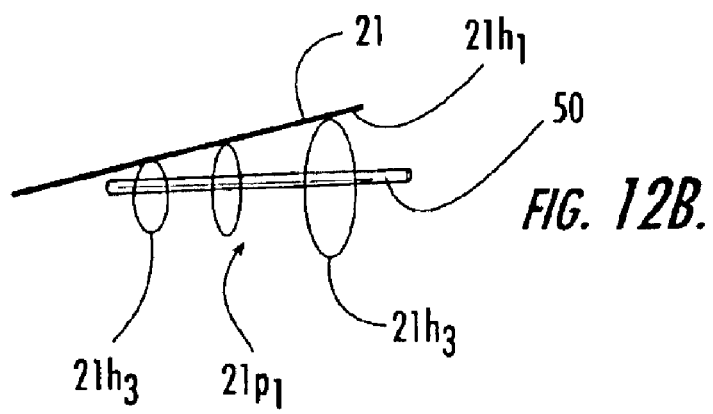
FIG. 12B is a schematic of another winding pattern according to embodiments of the present invention.

FIGS. 12A and 12B illustrate exemplary winding motion patterns 21p, 21p' contemplated by certain embodiments of the instant invention. FIG. 12A illustrates a pattern 21p that is substantially constant over the winding of the length of the loading member 50 and that the arm 21 can be held substantially planar (horizontal) as it moves through the winding motion. FIG. 12B illustrates that a variable winding motion pattern 21p' can be generated. As shown, the winding pattern 21p' increases or amplifies from left to right to have greater minima and maxima height $21h_1$, $21h_3$ at various positions along the loading member (or between different loading members or products and/or can increase from left to right). FIG. 12B also illustrates that the arm 21 may be inclined during the winding operation (the arm can also be declined or operated at various times to be a combination of inclined, declined, or level. In addition, the winding pattern 21p, 21p' can vary in other manners (shape or pattern) along the length of winding a particular loading member 50 or vary for each or selected loading members or products.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An automated winder for an elongated product, comprising:
an elongated arm having an associated length and opposing first and second end portions, wherein, in position, said first end portion is adapted to receive an elongated item thereon from an extrusion and/or stuffer device located upstream of the automated winder, and wherein the second end portion is configured to release the elongated item therefrom after the item travels a desired distance over the length of the arm away from the extrusion and/or stuffer device; and a winding mechanism attached to said elongated arm a distance from said first end portion, said winding mechanism configured to cause said elongated arm to travel repetitively in a desired motion pattern so that, in operation, the winding mechanism causes the arm to release the elongated item in a manner that winds the elongated item about a suitably aligned transfer support member so that the one or more elongated products are looped about a suitably positioned transfer support member to define a plurality of suspension contact regions that are axially generally horizontally spaced apart on a respective single transfer support member.

2. An automated winder according to claim 1, wherein the length of the arm is about six feet.

3. An automated winder according to claim 1, wherein, in operation, said winding mechanism causes the arm to follow a closed path having both X and Y axis travel coordinates so that the arm travels a distance above and below the aligned transfer support member.

4. An automated winder according to claim 1, in combination with the transfer support member, wherein, in operation, the transfer support member has an associated travel path and, and wherein said winding mechanism causes the arm to follow a different travel path with a perimeter that extends above and below the travel path of the transfer support member so that a respective transfer support member travels from a rearward portion of the arm to a downstream portion of the arm during operative loading of the respective transfer support member to distribute multiple loops of the product along a length of the transport support member.

5. An automated winder according to claim 4, wherein the arm travel path defines a repetitive motion pattern with a closed perimeter, and wherein the transport support member travels in a generally straight line as the winder arm travels through its closed perimeter to load the transport member with multiple loops of the product.

6. An automated winder according to claim 5, wherein the repetitive motion pattern is substantially elliptical or oval.

7. An automated winder according to claim 4, wherein the arm travel path defines a repetitive motion pattern with an open perimeter so that a respective transfer support member travels from a rearward portion of the arm to a downstream portion of the arm during operative loading of the respective transfer support member to distribute multiple loops of the product along a length of the transport support member.

8. An automated winder according to claim 1, wherein said arm further comprises an endless conveyor that moves the item over the arm.

9. An automated winder according to claim 1, wherein said arm has a generally open configuration and comprises a stationary floor that supports the elongated item thereon.

10. An automated winder according to claim 1, wherein the elongated item is an extruded or stuffed product held in a casing.

11. An automated winder according to claim 1, wherein the elongated item is a meat product.

12. An automated winder according to claim 11, wherein the elongated meat product is a contiguous length of portioned or linked meat.

13. An automated winder according to claim 11, wherein the elongated meat product is a contiguous length of non-linked meal.

14. An automated winder according to claim 1, in combination with the transfer support member, wherein the transfer support member has a length that is at least about two feet.

15. An automated winder according to claim 1, wherein, in operation, each respective transport support member travels in cooperating alignment with the arm from a location that is upstream of an intermediate portion of the arm to a location that is proximate or downstream of a discharge end portion of the arm.

16. An automated winder according to claim 1, in combination with a transfer support member, wherein the arm second end is in communication with an end guide that includes an axially extending receiving aperture that receives the elongated item therein and helps direct the elongated item onto the transfer support member as the arm moves through the desired motion pattern.

17. An automated winder for an elongated product, comprising:
   an elongated arm having an associated length and opposing first and second end portions, wherein, in position, said first end portion is adapted to receive an elongated item thereon from an extrusion and/or stuffer device located upstream of the automated winder, and wherein the second end portion is configured to release the elongated item therefrom after the item travels a desired distance over the length of the arm away from the extrusion and/or stuffer device;and
   a winding mechanism attached to said elongated arm a distance from said first end portion, said winding mechanism configured to cause said elongated arm to travel repetitively in a desired motion pattern so that, in operation, the winding mechanism causes the arm to release the elongated item in a manner that winds the elongated item about a suitably aligned transfer support member, wherein the elongated arm is configured with two vertically spaced apart primary surfaces defining a roof and floor, respectively, and wherein, in operation the elongated item travels therebetween in intimate contact with the floor and proximate to the roof.

18. An automated winder according to claim 17, wherein the roof and the floor are defined by endless conveyors.

19. An automated winder system, comprising:
   at least one elongated transfer support member having a length and sized and configured to hold a multi-loop arrangement of an elongated product thereon;
   an automated winder configured to be cooperably positioned and aligned with the discharge port of an extrusion/ stuffer device configured to discharge-elongated product therefrom, the automated winder comprising;
     an elongated arm having an associated length that is longer than the length of the transfer support member, said elongated arm having opposing first and second end portions, wherein, in position, said first end portion is adapted to receive an elongated item thereon from the extrusion device, wherein said second end portion is configured to release the elongated item therefrom after the item travels greater than a major portion of the length of the arm in a direction that is away from the extrusion/stuffer device, and wherein the arm is positioned in spaced apart cooperating alignment with the transfer support member; and
     a winding mechanism attached to said elongated arm, said winding mechanism is configured to cause said elongated arm to travel repetitively in a desired motion so that, in operation, the winding mechanism causes the elongated product to loop repetitively about a respective transfer support member as the product is released from the second end portion of the arm to load a multi-loop arrangement of product onto a respective transfer support member.

20. A system according to claim 19, wherein the transfer support member has a length that is at least about 2 feet, and wherein the transfer support member is translated away from the extrusion/stuffer device during operation so as to receive the wound product in a distributed manner over a desired length of the support member.

21. A system according to claim 19, wherein said transfer support member and said arm are spaced apart so that, in operation, the translation mechanism transfers the product onto the transfer support member so that product is arranged in substantially uniform looped lengths and suspended from the transfer support member over a generally horizontal length thereof.

22. A system according to claim 19, wherein, the system is adapted to sequentially and serially receive a plurality of transfer support members so that each is aligned with the arm of the winder to expose a generally horizontal length of the transfer support member to the arm for a desired interval of time so as to successively substantially continuously transfer and wind elongated product onto each of the plurality of transfer support members, and wherein, in operation, each respective transport support member travels in cooperating alignment with the arm from a location that is upstream of an intermediate portion of the arm to a location that is proximate or downstream of a discharge end portion of the arm.

23. A system according to claim 19, wherein the transfer support member is configured as a generally straight rod with a length of at least about two feet.

24. A system according to claim 19, wherein the system defines a portion of a food processing facility.

25. A system according to claim 19, wherein the length of the arm is at least about six feet.

26. A system according to claim 19, wherein, in operation, said winding mechanism causes the arm to follow a closed path with a vertical distance sufficient to move the arm a distance above and below the aligned transfer support member with the aligned transfer support member traveling along a generally straight horizontal line, wherein the aligned transfer support member moves during loading so that a forward portion of the transfer support member travel from a first location that is proximate a discharge portion of the arm to a second location that is downstream of the winding arm.

27. A system according to claim 19, wherein, in operation, said winding mechanism causes the arm to follow an open path with a vertical distance sufficient to move the arm a distance above and below the aligned transfer support member, and wherein the aligned transfer support member moves during loading so that a forward portion of the transfer support member travels from a first location that is proximate a discharge portion of the arm to a second location that is downstream of the winding arm.

28. A system according to claim 27, wherein,in operation, the arm travels a first bi-directional closed path, and the transfer support member is aligned with the arm so that it extends substantially orthogonally through the boundary defined by the first closed path, and wherein the transfer support member travels a second open unidirectional path.

29. A system according to claim 27, wherein the repetitive motion generated by the winding mechanism causes the arm to travel in a closed path.

30. A system according to claim 29, wherein the closed path has a substantially oval shape.

31. A system according to claim 27, wherein the repetitive motion generated by the winding mechanism causes the arm to travel in an open path.

32. A system according to claim 19, wherein said arm further comprises an endless conveyor that moves the item over the arm.

33. A system according to claim 19, wherein said arm comprises a stationary floor that supports the elongated item thereon.

34. A system according to claim 19, wherein the elongated item is an extruded or stuffed product held in a casing.

35. A system according to claim 19, wherein the elongated item is a meat product.

36. A system according to claim 35, wherein the elongated meat product is a contiguous length of portioned or linked meat.

37. A system according to claim 35, wherein the elongated meat product is a contiguous length of non-linked meat.

38. A system according to claim 19, wherein the length of the arm substantially corresponds to the length of the transfer support member.

39. A system according to claim 19, wherein the length of the arm is longer than the length of the transfer support member.

40. An automated winder system, comprising:
 at least one elongated transfer support member having a length and sized and configured to hold a looped arrangement of an elongated product thereon;
 an automated winder configured to be cooperably positioned and aligned with the discharge port of an extrusion/stuffer device configured to discharge-elongated product therefrom, the automated winder comprising:
  an elongated arm having an associated length that is longer than the length of the transfer support member, said elongated arm having opposing first and second end portions, wherein, in position, said first end portion is adapted to receive an elongated item thereon from the extrusion device, wherein said second end portion is configured to release the elongated item therefrom after the item travels greater than a major portion of the length of the arm in a direction that is away from the extrusion/stuffer device, and wherein the arm is positioned in spaced apart cooperating alignment with the transfer support member; and
 a winding mechanism attached to said elongated arm, said winding mechanism is configured to cause said elongated arm to travel repetitively in a desired motion so that, in operation, the winding mechanism causes the elongated product to wind about the transfer support member as it is released from the second end portion of the arm, wherein the elongated arm is configured with two vertically spaced apart primary surfaces defining a roof and floor, respectively, and wherein, in operation the elongated item travels therebetween in intimate contact with the floor and proximate to the roof.

41. A system according to claim 40, wherein the roof and the floor are defined by spaced apart endless conveyors.

42. An automated winder system, comprising:
 at least one elongated transfer support member having a length and sized and configured to hold a looped arrangement of an elongated product thereon;
 an automated winder configured to be cooperably positioned and aligned with the discharge port of an extrusion/stuffer device configured to discharge-elongated product therefrom, the automated winder comprising:
  an elongated arm having an associated length that is longer than the length of the transfer support member, said elongated arm having opposing first and second end portions, wherein, in position, said first end portion is adapted to receive an elongated item thereon from the extrusion device, wherein said second end portion is configured to release the elongated item therefrom after the item travels greater than a major portion of the length of the arm in a direction that is away from the extrusion/stuffer device, and wherein the arm is positioned in spaced apart cooperating alignment with the transfer support member; and
 a winding mechanism attached to said elongated arm, said winding mechanism is configured to cause said elongated arm to travel repetitively in a desired motion so that, in operation, the winding mechanism causes the elongated product to wind about the transfer support member as it is released from the second end portion of the arm, wherein the arm second end portion is in communication with an end guide that includes a receiving aperture that receives the elongated item therein and helps direct the elongated item onto the transfer support member as the arm moves through the desired motion pattern.

43. A system according to claim 42, wherein the end guide includes an inwardly oriented tongue having an outer perimeter associated therewith and two laterally spaced apart opposing sides, and wherein the elongated item is configured to enter the end guide to reside between the two sides in a direction that is outwardly away from the outer perimeter of the tongue.

44. A system according to claim 42, wherein the end guide includes an outwardly oriented tongue with two laterally spaced apart opposing sides, and wherein the elongated item is configured to enter the end guide to reside between the two sides inwardly of the outer perimeter of the tongue.

* * * * *